United States Patent [19]

Bout

[11] 4,317,163

[45] Feb. 23, 1982

[54] LUMINAIRE FOR AN ELECTRIC LAMP

[75] Inventor: Willem J. F. Bout, Hilversum, Netherlands

[73] Assignee: U.S. Philips Corporation, New York, N.Y.

[21] Appl. No.: 129,067

[22] Filed: Mar. 10, 1980

[30] Foreign Application Priority Data

Mar. 19, 1979 [NL] Netherlands .......................... 7902135

[51] Int. Cl.³ .......................... B60Q 3/04; F21M 1/00

[52] U.S. Cl. .......................... 362/362; 362/374; 362/375

[58] Field of Search .......................... 362/362, 375, 374

[56] References Cited

U.S. PATENT DOCUMENTS 2,120,449 6/1938 Vanderveld .......................... 362/375
3,025,094 3/1962 Buchanan .......................... 362/362
3,175,081 3/1965 Schaefer .......................... 362/362
4,220,986 9/1980 Matteo et al. .......................... 362/362

*Primary Examiner*—Benjamin R. Padgett
*Assistant Examiner*—Irwin Gluck
*Attorney, Agent, or Firm*—Robert S. Smith

[57] ABSTRACT

A luminaire for an electric lamp in which the two parts of a bipartite housing having a double-hinge are connected together comprises according to the invention a stop by which the possibility of rotation around a shaft of the double hinge is restricted. In spite of an overlap of one part of the housing by the other part of the housing, the housing is opened and closed thereby in a quasi-single rotating movement.

In a special embodiment means are present near the main point of rotation so as to space the two parts of the housing from each other upon opening same.

4 Claims, 10 Drawing Figures

LUMINAIRE FOR AN ELECTRIC LAMP

The invention relates to a luminaire for an electric lamp having a bipartite housing of which one part engages around the other and is connected thereto by means of a double-hinge situated within the housing, of which double-hinge a first shaft is connected to the side wall of a first part of the housing and the second shaft is connected to the second part of the housing, both shafts being incorporated in a rigid hinge intermediate member while being spaced from each other and parallel to each other.

Such a luminaire is disclosed in German Pat. No. 1,027,794.

The known luminaire consists of an illuminator having a fully transparent door which is used for street-lighting in a horizontal position with the transparent door lowermost. The object of the hinge construction used is to effect that a packing provided between the illuminator and the door is uniformly loaded throughout its length when the door is or is being closed. When a single hinge is used, the packing on the hinge side of the housing and the door is as a matter of fact loaded with sliding forces in quite a different manner than on the oppositely located side (mainly pressure forces), which may lead to destruction of the packing. When a double-hinge is used, the advantage of a fixed connection between illuminator and door presented by a single hinge is maintained also when the door is opened.

However, the known construction suffers from the disadvantage that the interior of the illuminator is difficult of access when the door is open. This is caused in that the shaft which is connected to the door is present in the plane of symmetry of the door or slightly on the side thereof.

Another disadvantage which is felt in particular on assembling the luminaire with the hinge shafts in a vertical position is that a complicated movement has to be carried out to close the door. This occurs notably when the door engages tightly around the housing or the housing around the door. Nevertheless, if it is desired to suspend the door so as to be hingeable, the use of a double-hinge is necessary in those cases so as to create space to pivot the door.

It is an object of the invention to provide a luminaire having a hinge construction in which these disadvantages are reduced.

In agreement herewith the invention relates to a luminaire of the kind mentioned in the opening paragraph which is characterized in that the rotation of the second part of the housing about the second shaft of the double-hinge is restricted by a stop.

Due to the restriction if the possibility of rotation about the second shaft, the hinge behaves as a quasi-single hinge with the first shaft as the hinge shaft. The movement which is preformed by the swingable part of the housing upon closing then is substantially that of a simple rotation. The extent to which the possibility of rotation can be restricted depends on the geometry of the luminaire. According as one part of the housing further overlaps the other part of the housing, the possibility of rotation must be larger. In a given housing, when a larger distance between the two shafts of the double-hinge is used, a smaller possibility of rotation is sufficient than with a smaller distance between the hinges. Generally the possibility of rotation about the second shaft will be restricted to that angle which is necessary to separate one part of the housing from the other part of the housing, that is to say when opening the housing to remove the overlap of one part of the housing by the other part of the housing. In a practical situation it will present no problems to those skilled in the art to determine the minimum required rotation about the second shaft.

It has been found that, while maintaining a tight fit of the two parts of the housing, one part can still give a considerable overlap with the other part when the rotation about the second shaft is restricted to 15°.

When the luminaire is assembled with the swingable part of the housing in a horizontal position, said part, after unlocking, will assume a substantially vertical position under the influence of gravity, so that the interior of the luminaire is fully accessible.

In one embodiment which is particularly suitable for use with the hinge shafts in a vertical position, detaching means are present near the first shaft so as to space apart the two parts of the housing when the housing is opened. Said means may be tensioning springs or compression springs. In a special embodiment, said detaching means also serve to lock the housing in the closed condition. In that case the detaching means consist, for example, of a first nose-shaped projection mounted in one part of the housing and present opposite to a second nose-shaped projection resiliently accommodated in the other part of the housing, which projections in the closed condition of the housing are in engagement with each other. It may be preferred to provide two pairs of such projections.

In a special embodiment at least two double-hinges are present. In a modified embodiment the hinge intermediate members of the double-hinges are coupled together. The advantage of this is that the two parts of the housing in any position assume a readily defined position relative to each other.

The luminaire according to the invention is particularly suitable for usento display traffic signals, for example, warning signals and traffic commands, for example, speed limits, half signs and the like. It is of importance that the luminaire can be given smooth walls without projections so that filthiness is avoided for the greater part.

Embodiments of luminaires according to the invention are shown in the accompanying drawings. In the drawings.

Figure 1:
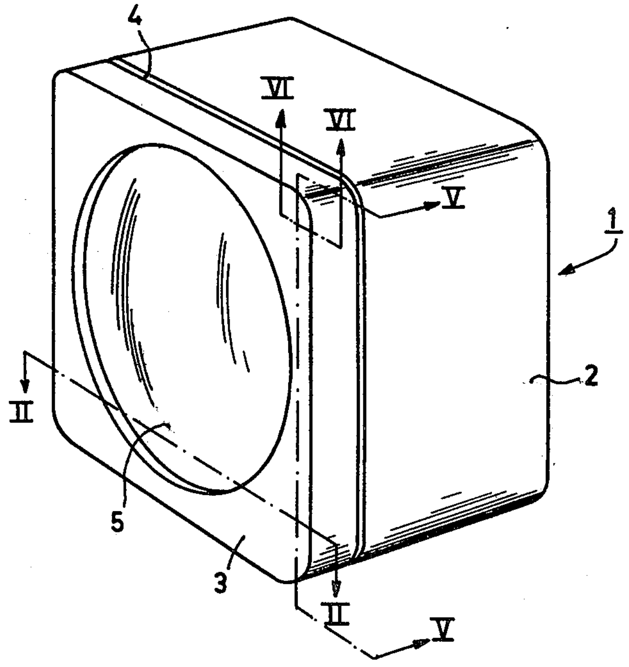
FIG. 1 is a perspective view of a luminaire.

In FIG. 1, the housing 1 comprises a first part 2 which forms an illuminator, and a second part 3, a door for the illuminator 2. The first part 2 has a narrowed rim 4 around which the second part 3 engages. A cover glass 5 is present in the second part 3 of the housing 1.

Figure 2:
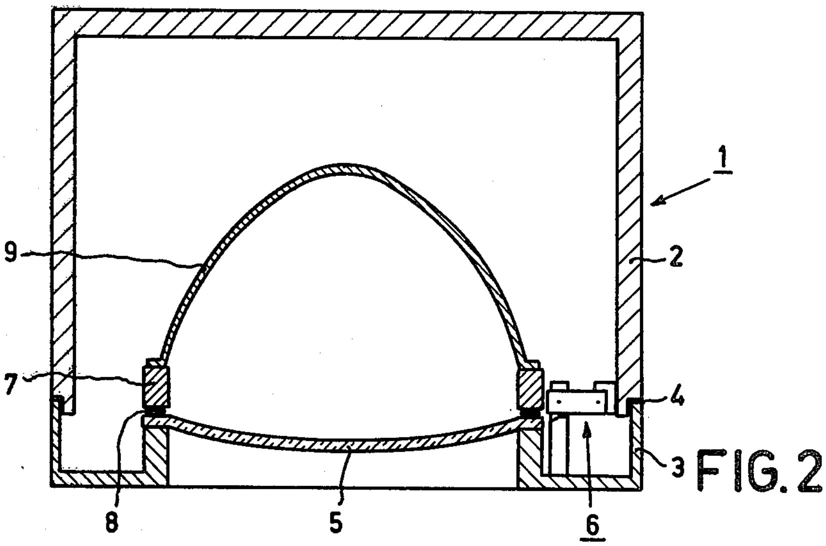
FIG. 2 is a sectional view through the luminaire shown in FIG. 1 taken on the line II—II.

Reference numerals 2 to 5 in FIG. 2 denote the same components as in FIG. 1. Part 2 of the housing includes a double-hinge 6 and has an annular member 7 adjoined by part 3 of the housing via a packing ring 8. A reflector 9 for an electric lamp is provided.

Figure 3:
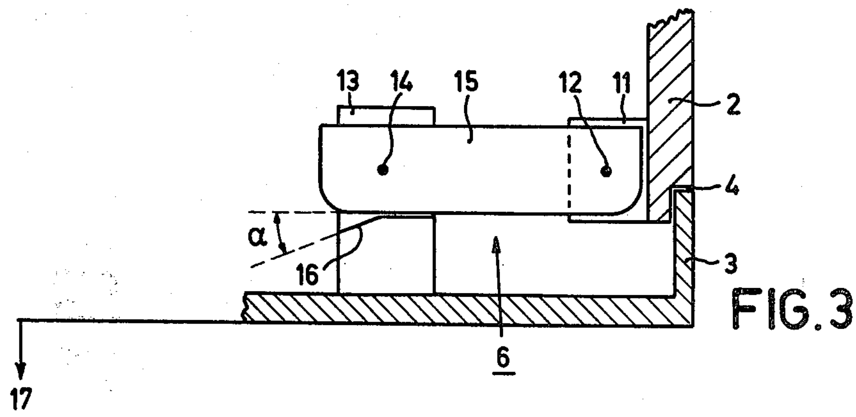
FIG. 3 shows a detail of FIG. 2.

In FIG. 3, part 2 of the housing has a lug 11 in which a first shaft 12 of double-hinge 6 is connected. Part 3 of the housing comprises a lug 13 which has a second shaft 14 of the double-hinge. Both shafts 12 and 14 are spaced from each other in a hinge intermediate member 15.

Lug 13 has an edge 16 which makes an angle $\alpha$ of approximately 12°0 with the hinge intermediate member 15 and forms a stop therefor.

When the housing is opened by exerting a pulling force in the direction of the arrow 17, rotation takes place about both shafts 12 and 14 until hinge intermediate member 15 abuts against the stop 16. From that instant on, part 3 of the housing rotates only on shaft 12. Shaft 12 constitutes a main point of rotation about which part 3 of the housing in the Figure can swing over approximately 90°, while shaft 14 forms an auxiliary point of rotation having a limited angle of rotation serving only to detach part 3 of the housing from part 2 of the housing and to make space for swinging part 3.

The movement of part 3 upon opening and closing the luminaire is substantially a single rotation for the operator.

Figure 4:
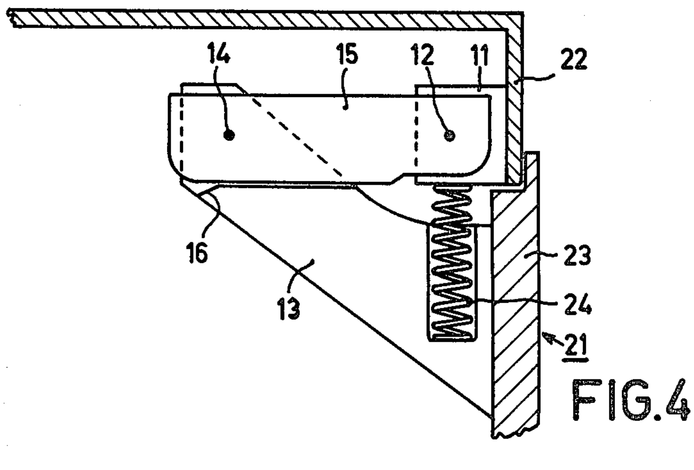
FIG. 4 shows a modified embodiment of FIG. 2 in detail.

In FIG. 4 a first part 22 of a housing 21 which part forms a door for a second part 23 of the housing, which part forms an illuminator. Reference numerals 11 to 16 denote the same components as in FIG. 3. A helical spring 24 serves to space part 22 from part 23 during opening the housing 21.

Figure 5:
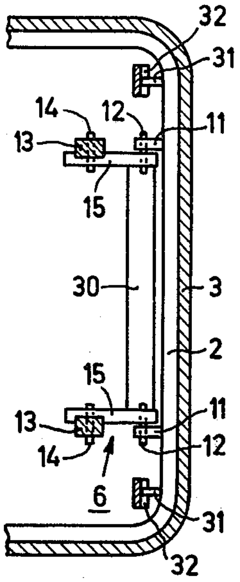
FIG. 5 is a sectional view of a modified embodiment of FIG. 1 taken on the line V—V.

In FIG. 5 the hinge intermediate members 15 are coupled together by a beam 30 which is rigidly secured to each of the hinge intermediate members. A nose-shaped projection 31 is secured to the first part 2 of the housing whilst a resiliently accommodated nose-shaped projection 32 is located on the second part 3 of the housing. The remaining reference numerals denote components which correspond to those of FIG. 3.

Figure 6:
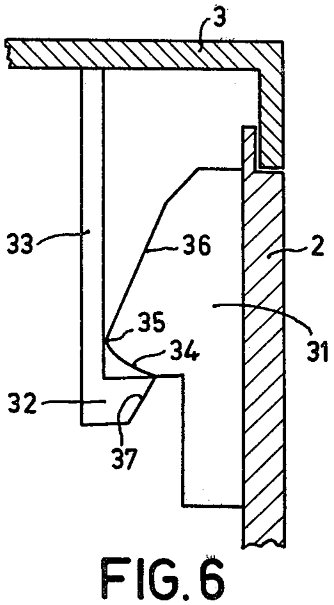
FIG. 6 is a sectional view of the same modified embodiment of FIG. 1 taken on the line VI—VI.
Figure 7A:
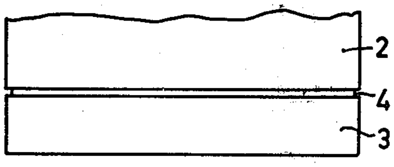
FIG. 7 is a plan view of the luminaire comprising detaching means shown in FIG. 6 in various stages during opening.
Figure 7C:
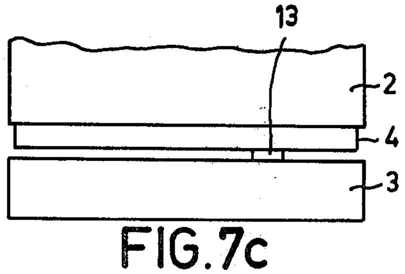
Figure 7B:
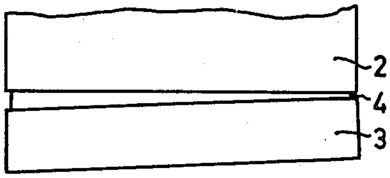
Figure 7D:
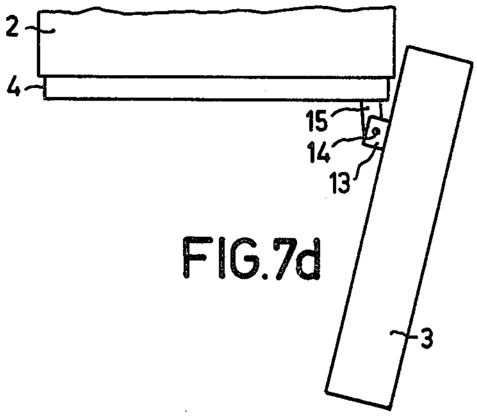

In FIG. 6 the wall of the first part 2 of the housing has a nose-shaped projection 31. The second part 3 of the housing has a nose-shaped projection 32 connected thereto by means of a resilient strip 33.

Upon opening the housing, projection 32 slides along the surface 34 of projection 31. Up to point 35 this is associated with a bending of strip 33. The surface 37 of projection 32 then starts sliding along the surface 36 of projection 31. Under the influence of the deformation of strip 33 a force is generated which is directed towards part 3 of the housing and which separates part 3 from part 2 of the housing.

In the closed condition of the housing, the projections 31 and 32 lock the housing on the hinge side.

In FIGS. *7a* to *7d*, a first part 2 of a housing, the second part 3 a narrowed rim 4 of part 2, a lug 13 on part 3, a hinge intermediate member 15 and a shaft 14 of a double-hinge are depicted.

FIG. *7a* shows the housing in the closed condition. In FIG. *7b* a small rotation around the two shafts of a double hinge has taken place. Projection 32 of FIG. 6 has slid to point 35.

In FIG. *7c*, strip 33 of FIG. 6 has spaced part 3 on the hinge side from part 2, while in FIG. *7d* the housing is opened. This Figure also shows the position of part 3 in the case in which the opened luminaire is suspended in a horizontal position.

Closing the luminaire occurs in the reverse sequence. However, it is also possible from the position shown in FIG. *7c* first to urge part 3 on the side on oppositely located to the hinge and then on the hinge side, or on both sides simultaneously. On the oppositely located side the housing may be locked, for example, with means corresponding to those shown in FIG. 6. Unlocking may be carried out by means of a push button in the wall of the housing or by means of a pin via an aperture provided in the housing.

What is claimed is:

1. A luminaire for an electric lamp having a bipartite housing one part of which engages around the other part and is connected thereto by means of a double-hinge situated within the housing, of which double-hinge a first shaft is connected to the side wall of a first part of the housing and the second shaft is connected to the second part of the housing, both shafts being incorporated in a rigid hinge intermediate member while being spaced from each other and being parallel to each other, characterized in that the rotation of the second part of the housing about the second shaft of the double-hinge is restricted by a stop.

2. A luminaire as claimed in claim 1, characterized in that detaching means are present near the first shaft of the double-hinge so as to space apart the two parts of the housing during opening the housing.

3. A luminaire as claimed in claim 2, characterized in that the detaching means also serve to lock the housing in the closed condition.

4. A luminaire as claimed in claim 3, characterized in that the detaching means consist of a first nose-shaped projection which is assembed in one part of the housing and which is situated opposite to a second nose-shaped projection resiliently accommodated in the other part of the housing, which projections in the closed condition of the housing engage each other.

* * * * *